(12) United States Patent
Irrgang et al.

(10) Patent No.: US 10,788,378 B2
(45) Date of Patent: Sep. 29, 2020

(54) DEVICE AND METHOD FOR RELIABLY AND PRECISELY DETERMINING THE TEMPERATURE OF A MEDIUM

(71) Applicant: Endress+Hauser Wetzer GmbH+Co. KG, Nesselwang (DE)

(72) Inventors: Klaus Irrgang, Geraberg (DE); Marc Schalles, Erfurt (DE)

(73) Assignee: Endress+Hauser Wetzer GmbH+Co. KG, Nesselwang (DE)

( * ) Notice: Subject to any disclaimer, the term of this patent is extended or adjusted under 35 U.S.C. 154(b) by 260 days.

(21) Appl. No.: 16/061,699

(22) PCT Filed: Nov. 15, 2016

(86) PCT No.: PCT/EP2016/077777
§ 371 (c)(1),
(2) Date: Jun. 13, 2018

(87) PCT Pub. No.: WO2017/102224
PCT Pub. Date: Jun. 22, 2017

(65) Prior Publication Data
US 2018/0364110 A1    Dec. 20, 2018

(30) Foreign Application Priority Data

Dec. 16, 2015   (DE) .................. 10 2015 122 004

(51) Int. Cl.
*G01K 1/00* (2006.01)
*G01K 7/00* (2006.01)
(Continued)

(52) U.S. Cl.
CPC ............ *G01K 13/02* (2013.01); *G01K 15/00* (2013.01); *G01K 15/002* (2013.01); *G01K 1/08* (2013.01);
(Continued)

(58) Field of Classification Search
USPC ... 374/148, 166, 110, 183, 208, 179, 1, 112, 374/142
See application file for complete search history.

(56) References Cited

U.S. PATENT DOCUMENTS 5,812,588 A * 9/1998 Deak .................. G01K 1/12
136/230
5,833,688 A * 11/1998 Sieben ............... A61B 18/1492
606/41

FOREIGN PATENT DOCUMENTS

CN       101821691 A     9/2010
DE        19939757 A1    2/2001
(Continued)

OTHER PUBLICATIONS

Search Report for German Patent Application No. 10 2015 122 004.0, German Patent Office, dated Sep. 23, 2016, 3 pp.
(Continued)

*Primary Examiner* — Mirellys Jagan
(74) *Attorney, Agent, or Firm* — Christopher R. Powers; Endress+Hauser (USA) Holding Inc.

(57) ABSTRACT

A device for determining the temperature of a medium in a tube or in a container is disclosed. The device includes a measuring tube protruding into the medium and closed at the end facing the medium by a measuring tube base, a resistance-based temperature sensor as a main sensor, and a thermoelectric voltage-based temperature sensor as an auxiliary sensor, arranged within the measuring tube at a fixed offset relative to the main sensor. The main sensor and the auxiliary sensor transmit measurement values to an analysis/transmitter unit. If the amount of a difference between the measurement values of the main sensor and the auxiliary sensor exceeds a first specified threshold, a fault notification relating to the integrity of the device is generated in the analysis/transmitter unit.

16 Claims, 4 Drawing Sheets

(51) Int. Cl.
*G01K 13/00* (2006.01)
*G01K 15/00* (2006.01)
*G01K 13/02* (2006.01)
*G01K 1/08* (2006.01)

(52) U.S. Cl.
CPC ..... *G01K 15/007* (2013.01); *G01K 2013/024* (2013.01); *G01K 2013/026* (2013.01)

(56) References Cited

FOREIGN PATENT DOCUMENTS

| | | | |
|---|---|---|---|
| DE | 102009058282 | B3 | 2/2011 |
| DE | 102012103952 | B3 | 8/2013 |
| EP | 0775897 | A1 | 5/1997 |
| EP | 0777115 | A1 | 6/1997 |
| EP | 1079219 | A2 | 2/2001 |

OTHER PUBLICATIONS

Search Report for International Patent Application No. PCT/EP2016/077777, WIPO, dated Jan. 20, 2017, 15 pp.

\* cited by examiner

DEVICE AND METHOD FOR RELIABLY AND PRECISELY DETERMINING THE TEMPERATURE OF A MEDIUM

CROSS-REFERENCE TO RELATED APPLICATIONS

The present application is related to and claims the priority benefit of German Patent Application No. 10 2015 122 004.0, filed on Dec. 16, 2015 and International Patent Application No. PCT/EP2016/077777 filed on Nov. 15, 2016, the entire contents of which are incorporated herein by reference.

TECHNICAL FIELD

The invention relates to a device for reliably and precisely determining the temperature of a medium in a container or tube that is installed or can be inserted in a container or tube wall, with two different types of temperature sensors that are arranged in a closed measuring tube. Furthermore, the invention relates to a method in which the device is used in several method steps for reliably and precisely determining the temperature of a medium.

The medium can, for example, be a liquid or a gas.

BACKGROUND

Installed contact thermometers are offered and marketed in different designs by the E+H Group, as well as by Temperaturmesstechnik Geraberg GmbH. Such devices generally have an error, termed an installation error, that is a systematic, static/thermal measuring error when measuring the temperature with installed contact thermometers. It stems from the fact that the temperature which exists at the measuring point is not identical with the temperature of the medium. The installation error is described in VDINDE Directive 3511, Chapter 3.

The installation error is present in the case of a contact thermometer that has a temperature sensor within a measuring tube, wherein the measuring tube extends into the medium in order to measure the temperature. At the end of the measuring tube facing the process, the measuring tube is closed by a measuring tube base. The measuring tube contains the temperature-sensitive component that measures the temperature. The sensitive components are only indirectly in contact with the medium, since only the outer walls of the measuring tube are in thermal equilibrium with the medium (i.e., have the same temperature). The measuring tube has a process connection. The process connection is located at the end of the measuring tube facing away from the process, and therefore lies outside of the container or tube in which the medium is located. Consequently, the process connection is in thermal equilibrium with the environment (or with the tube or container wall).

The installation error is caused by a heat flow within the closed measuring tube that arises because the process connection is in thermal equilibrium with the environment (or the container or tube wall), and because the end of the measuring tube (or the measuring tube wall) facing the process is in thermal equilibrium with the medium.

With a hotter medium and a colder process connection, the heat flow runs from the base of the measuring tube to the process connection and causes a removal of heat from the temperature sensor. With a colder medium and a hotter process connection, the heat flows in the opposite direction towards the temperature sensor. In any event, a distortion arises due to the heat flow within the measuring tube. This distortion can be a multiple of the permissible temperature sensor tolerance. This distortion is particularly large when thick-wall measuring tubes such as metallic protective tubes are used, and, in particular, when a low thermal transfer value α is present in the transfer of heat from the medium to the measuring tube.

With a closed, elongated measuring tube with a longitudinal axis that is perpendicular to the container of the medium (or perpendicular to the wall of the tube through which the medium flows), the heat flow that arises due to the difference in temperature between the medium and process connection runs along the longitudinal axis of the measuring tube. A correction of the installation error can be achieved in this case by design measures, by arranging several temperature sensors offset along the longitudinal axis of the measuring tube. A corrected temperature is then determined using the measurement values of the offset temperature sensors. In the prior art, various devices are disclosed with several, longitudinally-offset temperature sensors.

In one class of these devices, the longitudinally-offset temperature sensors serve to determine the temperature profile or the temperature distribution within a medium, and not to correct the installation error. DE 195 448 80 A1 discloses, for example, several thermocouples in a measuring tube. The measuring tube has several flow channels. DE 195 09 105 C2 discloses a measuring tube with several temperature sensors, wherein the temperature sensors are attached to the outer wall of the measuring tube. In these disclosures, the medium is therefore in direct contact with the temperature sensors at various points. The temperature profile within the medium can accordingly be determined. An installation error correction is, by contrast, not performed in this class of devices, since other heat dissipation physics predominate than in a closed measuring tube. Since there is no directed heat flow within a closed measuring tube during measurement, the installation error is not present in this case.

A device for correcting the installation error is disclosed in DE 199 39 757 A1. Two or more temperature sensors are arranged offset within the longitudinal axis of the measuring tube. These are identical, resistance-based temperature sensors.

In principle, the more temperature sensors arranged offset in a closed measuring tube, the more precisely the installation error can be corrected. In practice, it is, in contrast, extremely advantageous to not use more than two temperature sensors. Due to the lessened space requirement, the use of two temperature sensors makes it possible to use measuring tubes of standardized dimensions. Moreover, the use of two temperature sensors enables a simplified correction formula, and concomitantly simplified signal processing. The use of only two temperature sensors therefore also enables, in particular, a very economical realization of the installation error correction.

The measurement values of the two temperature sensors are evaluated and transmitted by an analysis/transmitter unit. The temperature sensor of the two temperature sensors that is arranged more closely to the measuring tube base is termed a main sensor. By using the measurement values of the two temperature sensors, the temperature corrected by the installation error $T_{H,korr}$ of the main sensor closer to the base can be determined as follows from the measurement values $T_H$ of the main sensor and $T_N$ of the auxiliary sensor (K. Irrgang, L. Michalowsky, "Temperaturmesspraxis mit Widerstands-thermometern and Thermoelementen," Vulkan-Verlag, Essen, 2004)

$$T_{H,korr} = T_H + K_{H'}(T_H - T_N) = T_H + K_H \Delta T \text{ where } \Delta T = T_H - T_N$$

The correction factor for correcting the main sensor $K_H$ is stored in an analysis/transmitter unit. It is determined by the dimensions and the employed material of the device, and is predetermined according to the type of medium in the analysis/transmitter unit. The value of the second temperature sensor—termed the auxiliary sensor—which is corrected by the installation error can be determined analogously. For this, a second correction factor $K_N$ is used that is different from the first correction factor $K_H$.

$$T_{N,korr} = T_N + K_{N'}(T_H - T_N) = T_N + K_N \Delta T$$

This simple correction formula advantageously requires only a very small computing capacity in the analysis/transmitter unit.

The use of two identical, resistance-based temperature sensors for correcting the installation error can, however, be very problematic, since such a device is very sensitive to damage to the measuring tube and to the insulation of the measuring circuits of the two resistance-based sensors.

Such damage can, for example, be caused by changes in humidity in the measuring tube. Hygienic requirements in the food sector necessitate cyclical, hot steam cleaning of the plants. Due to the high temperature gradient in the hot steam jet, moisture penetration into the measuring tube can repeatedly occur. The penetration of moisture leads to a change in the insulation of the electrical measuring circuits of the temperature sensors in the measuring tube. In the event of a change in the insulation, the measurement values of identical temperature sensors change to the same degree. The change in the measurement values of the temperature sensors due to a change in insulation therefore cannot be distinguished from a change in the temperature of the medium. Consequently, damage via the measuring tube or the measuring circuits of the temperature sensors, when two identical measuring tubes are used with temperatures sensors that are offset along the measuring tube, remains unrecognized. This poses a major problem and prevents, in particular, use for applications that demand high functional reliability. The functional reliability is generally classified according to different steps, or the so-called "safety integrity level" (SIL). Depending upon the field of use, high SIL levels are required.

Measuring tubes are also presented in the prior art that achieve high functional reliability or correction of an age-related drift of a resistance-based temperature sensor, by means of two or more different temperature sensors. Such a device is, for example, disclosed in DE 10 2009 058 282 and in DE 10 2012 103 9 52. These devices, by contrast, do not disclose any option for correcting installation errors. Since the temperature sensors are not arranged offset along the longitudinal axis, the installation error caused by heat dissipation cannot be corrected.

An option for correcting the installation error with simultaneously high functional reliability is not disclosed in the aforementioned prior art.

SUMMARY

The aim of the invention is therefore to present an economical and space-saving device that simultaneously ensures high functional reliability and offers the option of correcting the installation error.

The aim is achieved by providing a device for determining the temperature in a tube or container, wherein the device is installed or can be inserted in a tube or container wall, with a measuring tube that protrudes into the medium and is closed by a measuring tube base at the end facing the medium, and that has a resistance-based temperature sensor as a main sensor, and a thermoelectric-based temperature sensor as auxiliary sensor. The main and auxiliary sensors are arranged within the measuring tube with a fixed offset relative to each other, with respect to the longitudinal axis of the measuring tube. The main sensor is attached more closely to the measuring tube base than the auxiliary sensor is. The process connection is located at the end of the measuring tube facing away from the process outside of the medium. The measuring circuits have electrical insulation with respect to the measuring tube. The changes in the electrical insulation of the measuring circuits influence the measurement values from the main and auxiliary sensors differently. If the amount of the difference between the measurement values $|\Delta T|$ exceeds a first specified threshold $\Delta T_{max}$, the analysis/transmitter unit generates an error message regarding the integrity of the device.

If the insulation resistance changes, this has a significant influence on the measurement value of the resistance-based sensor, whereas, in contrast, the measurement value of the thermoelectric-based auxiliary sensor is barely influenced, or influenced to only a negligible extent, such that, when temperature sensors are used that are based upon the two different measuring principles, high functional reliability is ensured. The measuring circuits of the main and auxiliary sensors can, for example, be designed so that the measuring circuit of the auxiliary sensor possesses less overall resistance than the measuring circuit of the main sensor by an order of magnitude, or a factor of 10. Accordingly, changes in the electrical insulation of the respective measuring circuits also influence the measurement values from the main and auxiliary sensors differently. The continuous comparison of the two measurement values of the two different types of temperature sensors therefore enables high functional reliability.

Consequently, in contrast to devices with two resistance-based temperature sensors in a measuring tube, the arrangement according to the invention is able to recognize damage to the integrity of the device. Due to the temperature sensors that are arranged longitudinally offset, the possibility also exists of correcting the installation error.

An advantageous development of the invention provides that a resistance-based sensor have a greater measuring precision.

Another advantageous embodiment of the invention provides that the main sensor have a greater thermal mass than the auxiliary sensor. Accordingly, the auxiliary sensor reacts faster than the main sensor located close to the measuring tube base.

This embodiment is particularly advantageous, since another source of error in the precise determination of the medium temperature can be rapid changes in temperature in the medium. Depending upon the timescale of the temperature changes in the medium and the timescale of the reaction time of the temperature sensors, temperature changes in the medium can lead to a phase shift in the response signal of the two temperature sensors. This phase shift is termed a dynamic error.

The reaction time of the temperature sensor depends substantially upon the thermal mass, which in turn is defined in the context of this application as the product of the specific thermal capacity $c_p$ and the mass m. If the auxiliary sensor which is further away from the base reacts faster than the main sensor closer to the base, a certain compensation for the dynamic error is achieved. Such a compensation for the dynamic error is excluded a priori when two structurally identical, resistance-based temperature sensors with an identical design are used.

In an advantageous development of the invention, the connection of the resistance-based main sensor to the analysis/transmitter unit is realized by a three-conductor circuit. In one variant of the development, the connection of the main sensor is realized with a four-conductor circuit. The three-conductor circuit in this case is particularly advantageous, since it needs only a very small amount of space within the measuring tube, and efficiently carries out signal processing.

The three-conductor circuit variant can be realized in the following manner: the main sensor closer to the base has two connecting conductors made of a material A. The first connecting conductor is connected to a first inner conductor pair, wherein the first inner conductor pair consists of the same material A. The second connecting conductor is connected to a second inner conductor pair. The second inner conductor pair consists of a first inner conductor made of the material A and a second inner conductor made of a second material B different from the first material A. The measuring point of the thermocouple or auxiliary sensor is formed by this connection of the intermediate conductor, made of the material A, and the inner conductor pair with inner conductors made of the materials A and B.

In this particularly advantageous variant of the development of the invention, the thermal measuring point of the thermoelectric-based auxiliary sensor is integrated in the wiring of the main sensor; at the same time, the connection of the resistance-based main sensor to the analysis/transmitter unit is realized in a three-conductor circuit.

In one embodiment of the invention, the measuring tube is designed as a protective tube. In a development of this embodiment, the protective tube contains an exchangeable measuring insert tube to which the temperature sensors are attached. This development of the embodiment is extremely advantageous, since the measuring insert tube can be removed from the protective tube to service the components and their wiring.

The variant of the embodiment of the invention with the protective tube and/or with the measuring insert tube additionally provides that the protective tube or measuring insert tube have a test channel, as described in utility model DE 20 2009 012292 U1. In the present application, the test channel serves to accommodate an arrangement of several additional temperature sensors that are arranged offset along the longitudinal axis of the measuring tube.

An embodiment of this development includes raising the thermal coupling of the main sensor to the medium. This is achieved by attaching a thermally-conductive foil to the base of the measuring insert tube. In this context, it is advantageous to attach the thermally-conductive foil to the side of the measuring insert tube base facing the protective tube.

Another advantageous embodiment of the invention provides for centering the measuring insert tube in the protective tube. This can, for example, be achieved by modifying the base shape of the measuring insert tube so that the diameter of the base of the measuring insert tube is larger than the diameter of the measuring insert tube. The measuring insert tube is thereby guided within the protective tube. This centering is advantageous to the transfer of heat between the protective tube and measuring insert tube.

The aim of reliably and precisely determining temperature is then achieved by the following method steps:

In a first method step, the difference between the measurement values from the main and auxiliary sensors ($\Delta T$) is determined by the analysis/transmitter unit, where $\Delta T = T_H - T_N$. Depending upon the result, the following second method step is performed:

a) If the amount of the difference between the measurement values from the main and auxiliary sensors ($|\Delta T|$) is greater than a first specified threshold ($\Delta T_{max}$), an error message is output regarding the integrity of the insulation of the device.

b) If the amount of the difference between the measurement values from the main and auxiliary sensors ($|\Delta T|$) is less than a second specified threshold ($\Delta T_{min}$): The temperature of the medium ($T_M$) is determined as the temperature of the main sensor ($T_H$).

c) If the amount of the difference between the measurement values from the main and auxiliary sensors ($|\Delta T|$) lies within a range between the second specified threshold ($\Delta T_{min}$) and the first specified threshold ($\Delta T_{max}$):

The corrected temperature of the main sensor $T_{H,korr}$ is determined according to $T_{H,korr} = T_H + K_H \Delta T$, wherein the correction factor for correcting the main sensor $K_H$ is stored in the analysis/transmitter unit.

The corrected temperature of the auxiliary sensor $T_{N,korr}$ is determined according to $T_{N,korr} = T_N + K_N \Delta T$, wherein the correction factor for correcting the auxiliary sensor $K_N$ is stored in the analysis/transmitter unit.

The temperature of the medium is determined by $T_M = \frac{1}{2}(T_{H,korr} + T_{N,korr})$.

The temperature difference is also determined in the first step. A first specified threshold ($\Delta T_{max}$) for the amount of the difference between the measurement values from the main and auxiliary sensors, which is clearly implied by a lack of insulation, is stored in the analysis/transmitter unit. Damage to the insulation can be reliably recognized by suitable selection of the threshold.

If the amount of the difference between the measurement values from the main and auxiliary sensors lies below the first specified threshold ($\Delta T_{max}$), the correction method for the installation error correction can be used. If, however, the measurement values do not correspond within a specified limit before the correction, a correction of the installation error is not performed in the method according to the invention. If the amount of the difference between the measurement values from the main and auxiliary sensors lies below a second specified threshold ($\Delta T_{min}$), the temperature of the medium ($T_M$) is therefore determined as the temperature of the main sensor ($T_H$), since the main sensor has greater measuring precision. The second specified threshold can, for example, be twice as large as the tolerance of the sensors. Since the auxiliary sensor possesses a lower measuring precision than the main sensor, it is advisable to omit the correction method.

If the amount of the difference between the measurement values from the main and auxiliary sensors ($|\Delta T|$) lies within the range between the second specified threshold ($\Delta T_{min}$) and the first specified threshold ($\Delta T_{max}$), both of the measurement values from the main and auxiliary sensors are then corrected using the formula for the installation error correction and the correction factors for the main sensor ($K_H$) and the auxiliary sensor ($K_N$) stored in the analysis/transmitter unit.

The two corrected temperatures from the main and auxiliary sensors ideally correspond, due to the adjustment during calibration and the determination of the correction factor. In practice, the two corrected values may, however, differ. A certain adjustment therefore occurs, due to the communication of the two corrected temperature values.

Accordingly, like the individual method steps, the method according to the invention describes how the technical objective of simultaneous high functional reliability and installation error correction can be realized.

In the method described herein, insulation monitoring is carried out first, and then subsequent installation error correction. Since the installation error correction depends upon the difference between the two measurement values to the same extent, this procedure is especially advantageous when it is expected that a sizable difference between the measurement values from the main and auxiliary sensors is primarily due to the insulation error, whereas the installation error constitutes a significantly smaller contribution to the difference between the measurement values.

In a variant close to the method according to the invention, the installation error correction can also be performed initially, and then insulation monitoring can be performed using the measurement values corrected by the installation error. The choice of sequence is obvious to a person skilled in the art, due to the magnitudes of the errors to be anticipated from the selection of the device features. In another variant close to the method according to the invention, simultaneous monitoring of the uncorrected and corrected values from the main and auxiliary sensors is also provided for.

In a development of the method according to the invention, additional drift control is enabled. Whereas the drift between two structurally identical temperature sensors is indiscernible during use, different drift curves exist for temperature sensors of different types. In particular, the method according to the invention provides for designing the auxiliary sensor such that it is substantially more stable over the long term than the main sensor, within the temperature range assumed by the medium. In this context, "substantially more stable over the long term" means that the rate of drift of the auxiliary sensor is less than the rate of drift of the main sensor by at least one order of magnitude, or a factor of 10.

In a development of the method according to the invention, a drift correction of the main sensor is always performed when the auxiliary sensor passes a specified temperature point ($T_N^{kal.}$). At the same time, it must always be checked that the amount of the difference ($|\Delta T|$) between the measurement values from the main and auxiliary sensors lies within a range between the second specified threshold ($\Delta T_{min}$) and the first specified threshold ($\Delta T_{max}$). At a specified temperature point (such as 80° C.), the deviation between the measurement value from the main and auxiliary sensors arising from the installation error is known. In particular, the uncorrected value that the main sensor should display when the auxiliary sensor passes the uncorrected value ($T_N^{kal.}$) is known. In this context, this uncorrected value is termed $T_H^{kal}$.

If the auxiliary sensor now passes the specified temperature point ($T_N^{kal.}$), it can be checked whether the associated uncorrected value of the main sensor displays the associated theoretical value ($T_H^{kal.}$). A deviation different therefrom must be due to the drift of the main sensor. If the temperature displayed by the main sensor, therefore, differs by more than a specified threshold from the uncorrected temperature value of the main sensor ($T_H^{kal.}$) belonging to the specified temperature point of the auxiliary sensor ($T_N^{kal.}$), a message regarding the drift of the main sensor is output. At the same time, the measurement value from the main sensor is updated to the uncorrected temperature value of the main sensor ($T_H^{kal.}$) belonging to the specified uncorrected temperature value of the auxiliary sensor ($T_N^{kal.}$). In this particularly advantageous development, the device is therefore able to simultaneously perform drift correction and installation error correction, to ensure high functional reliability.

This development of the method according to the invention for correcting drift is especially highly reliable when the temperature distribution of the medium on the measuring tube is known. In an advantageous variant of this development, the drift can also be corrected when the measuring tube is removed from the process in a recalibration procedure (after a certain insertion time), and the temperature of the main and auxiliary sensors is determined in a reference medium with a homogeneous temperature distribution and at a specified reference temperature. The temperature that belongs to the specified temperature point of the auxiliary sensor ($T_N^{kal.}$) is then selected as the reference temperature. Due to the homogeneous temperature distribution of the reference medium, the aforementioned method is particularly suitable for achieving precise control or correction of the drift of the main sensor.

In an alternative development of the method according to the invention, drift control is enabled by saving the temporal course of the measurement values from the main and auxiliary sensors in the analysis and transmitter unit. In a variant close thereto, the temporal course is saved in a control center connected to the analysis and transmitter unit.

In this alternative development, the drift can be corrected by observing the temporal course of the measurement values from the main and auxiliary sensors over a specified time span. Here as well, at the same time, it must always be checked that the amount of the difference ($|\Delta T|$) between the measurement values from the main and auxiliary sensors lies within a range between the second specified threshold ($\Delta T_{min}$) and the first specified threshold ($\Delta T_{max}$). If the temporal course now deviates from a parallel course, a drift of the main sensor must be present. In particular, by using a criterion, a specified threshold is chosen for a temporal course that deviates from the parallel course. If this specified threshold is exceeded, a message is output regarding the drift of the main sensor. At the same time, the measurement value of the main sensor is updated to a course parallel to the measurement values of the auxiliary sensor.

The invention therefore offers a device and a method by means of which high functional reliability, correction of the installation error (which is unavoidable with temperature sensors in closed measuring tubes), and monitoring and correction of the drift of the resistance-based main sensor are simultaneously made possible in a space-saving realization. These three advantages are achieved in that two independent temperature sensors measure the temperature offset along the longitudinal axis of the measuring tube, and the temperature sensors used therefor are founded upon a resistance-based and thermoelectric-based measuring principle.

BRIEF DESCRIPTION OF THE DRAWINGS

The invention is explained in greater detail with reference to the following figures. These show.

DETAILED DESCRIPTION

Figure 1:
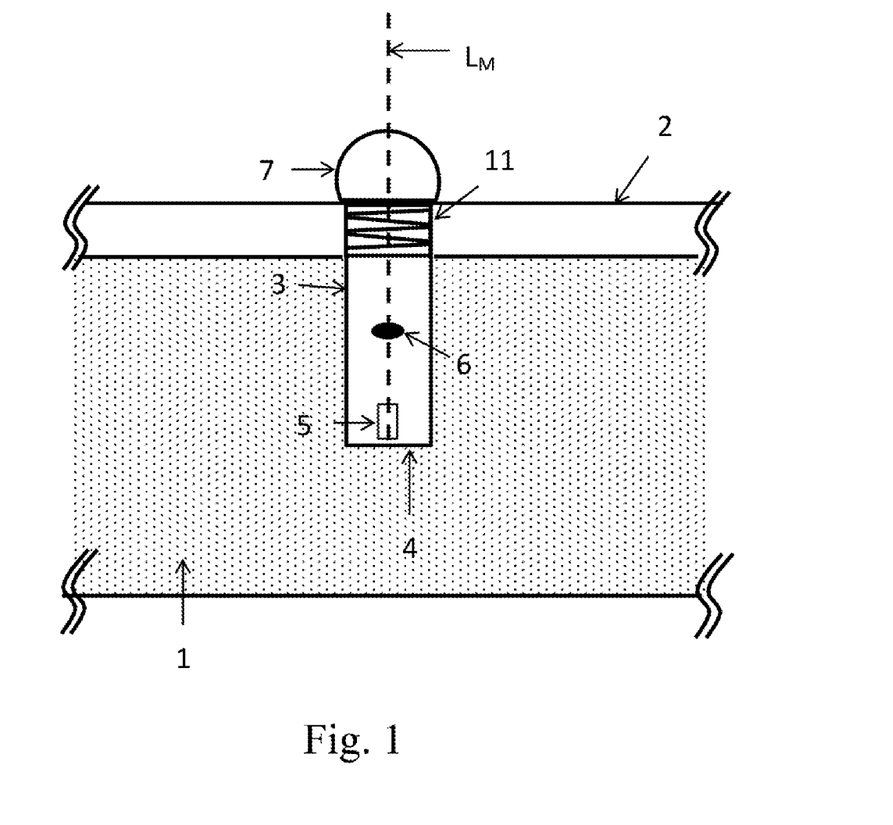
FIG. 1 shows an exemplary embodiment of the device according to the invention installed in the container or tube wall.

FIG. 1 shows an example of an embodiment of the device according to the invention. The closed measuring tube 3 installed in the container or tube wall 2 by a process connection 11 measures the temperature of the medium 1 and protrudes into the medium 1 for this purpose. The base 4 of the measuring tube 3 is located at the end of the measuring tube 3 facing the medium 1. Two temperature sensors are used, wherein a resistance-based temperature sensor is attached as the main sensor 5 close to the base 4 of the measuring tube 3, and a thermocouple is attached as the auxiliary sensor 6 offset along the longitudinal axis $L_M$ of the measuring tube 3. The two temperature sensors measure the temperature and provide their measurement values to an analysis/transmitter unit 7 that outputs the temperature of the medium 1 using the measurement values that are transmitted to it, and then provides them to a control center via a wired or wireless measurement transmission path (not shown). The analysis/transmitter unit 7 is located beyond the container wall or tube wall 2 of the container or tube which contains the medium 1, the temperature of which is to be reliably and precisely determined.

If moisture arises in the measuring tube 3, then the insulation resistance of the measuring circuits drops significantly. The insulation resistance $R_{iso}$ can initially drop to 100 kΩ, for example. If the measuring tube 3 is completely under water, the insulation resistance can even drop to 10 KΩ. The following influence is manifested on the absolute error of the temperature measurement values from the main sensor 5 and auxiliary sensor 6 for two possible variants of the main sensor 5 (a Pt 200 thermometer and a 2 kΩ thermistor).

| Measuring error with a reduction in the insulation resistance | | Temperature error for $R_{iso}$ = 100 kΩ | Temperature error for $R_{iso}$ = 10 kΩ |
|---|---|---|---|
| Auxiliary sensor | | 0.1 K | 1.2 K |
| Main sensor | Pt 200 | 3.6 K | 36 K |
| | 2 kΩ | 10 K | 100 K |

This table shows that, with standard wiring, a reduction in the insulation resistance to the measurement value has a significant influence on the resistance-based, main sensor 5, whereas it is scarcely noticeable in the measurement value of a thermoelectric-based auxiliary sensor 6.

Damage to the insulation can be reliably recognized by the suitable selection of the specified threshold $\Delta T_{max}$. The selection of the specified threshold $\Delta T_{max}$ is obvious to a person skilled in the art, depending upon the employed resistance-based main sensor 5, and upon the magnitude of the difference in temperature that is accordingly to be anticipated due to a lack of insulation. Consequently, in contrast to devices with two resistance-based temperature sensors in a measuring tube 3, the present arrangement is able, according to the invention, to recognize damage to the integrity of the device. The device is therefore suitable for achieving a high SIL, in light of functional safety considerations.

For each of the two temperature sensors, a correction factor $K_H$ or $K_N$ is stored in the analysis/transmitter unit 7.

In the analysis/transmitter unit 7, the user, before startup, must select the design of the device (or with or without an exchangeable measuring insert tube 9), as well as a specification of liquid and gaseous media. The correction factors can be selected at startup by means of a classification table of the following type, which is stored in the analysis/transmitter unit 7.

| Medium | Ø of protective tube [mm] (and Ø of measuring insert tube) | With measuring insert tube | Without measuring insert tube |
|---|---|---|---|
| Oil | 4.5 | | $K_H$, $K_N$ |
| | 6 | | |
| | 9 | | |
| Milk | 4.5 | | |
| | 6 | | |
| | 9 | | |
| Water | 4.5 | | |
| | 6 | | |
| | 9 | | |

In addition, the correction factors can be checked and readjusted at at least one operating point, wherein a sufficiently homogeneous medium should be used, or a medium with a sufficiently homogeneous temperature distribution. Different operating points are here defined by the selection of the insertion depth of the measuring tube 3 and by the selection of the medium 1, the temperature of the medium 1 and the surroundings, as well as by the geometry of the measuring tube 3 (or the protective tube 8 and measuring insert tube 9), since these parameters largely determine the installation error.

If $\Delta T = (T_H - T_N)$, then $$T_{H,korr} = T_H + K_H \cdot \Delta T$$

$$T_{N,korr} = T_N + K_N \cdot \Delta T$$

In the method according to the invention, the correction method should be used only when the differences in temperature are not caused by a change in the insulation resistance; this is established by the appropriate selection of the first specified threshold $\Delta T_{max}$.

The correction method should also be omitted when the uncorrected measurement values from the main 5 and auxiliary 6 sensors, within a certain tolerance, are in agreement; this is established by the suitable selection of the second specified threshold $\Delta T_{min}$.

By means of the at least one operating point, the two correction factors $K_H$ and $K_N$ for the main 5 and auxiliary 6 sensors are then adjusted, so that the two corrected temperatures correspond with respect to the calibration state. In other words, after calibration, at the operating point, the following relationship between the two corrected temperature values from the main and auxiliary sensors applies:

$$T_{H,korr} = T_{N,korr}$$

Through conversion, this relationship can be reduced to a relationship that is equivalent thereto between the two correction factors at the operating point.

$$K_N = 1 + K_H$$

At the calibration point, the precise relationship between the correction factors $K_H$ and $K_N$ that is described in the above formula thus applies. The more the conditions that predominate in use (temperatures, insertion depths, etc.) deviate from the operating point, the more the above-defined correction factors (that theoretically should correct the measured temperature of the main sensor 5 and the measured temperature of the auxiliary sensor 6 to the same corrected temperature value) supply corrected values that deviate from each other. As long as an insulation error-related difference is excluded (which is ensured by the appropriate selection of the threshold $\Delta T_{max}$), differing corrected temperatures $T_{H,korr}$ and $T_{N,korr}$ can, for example, result, because a remaining dynamic error or a phase shift between the main 5 and auxiliary sensor 6 is present.

Consequently, in any case, the precise temperature of the medium 1 is determined as an average of the two corrected temperature values from the main 5 and auxiliary sensor 6:

$$T_M = \tfrac{1}{2}(T_{H,korr} + T_{N,korr})$$

Figure 3:
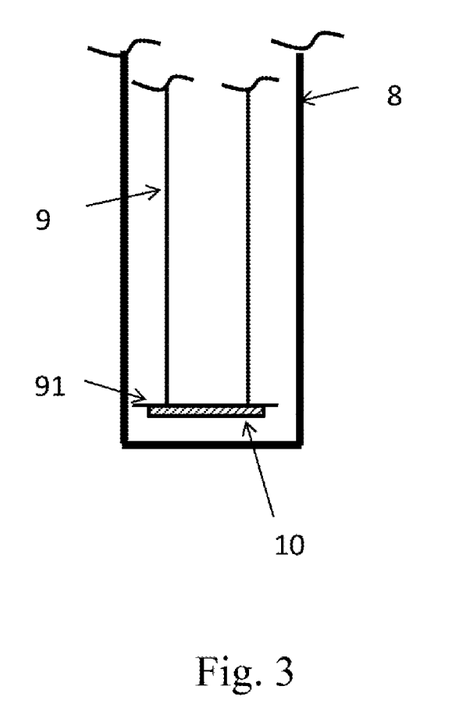
FIG. 3 shows an embodiment of the device according to the invention as a protective tube and measuring insert tube.

In the variant of the embodiment of the invention with a test channel in the protective tube 8 and/or in the measuring insert tube 9, it is additionally provided for the measurement values of the additional temperature sensors in the test channel to be used for an additional (not initial) calibration process. In this additional (not initial) calibration process, the correction factor K for the installation error correction is checked and/or more precisely determined. When three additional temperature sensors are used, greater precision in determining the correction factor K is thereby achieved. This variant of the invention is suitable, in particular, for instances in which a precise knowledge of the correction factor K is desirable, e.g., in areas of application with greater precision requirements, and/or in situations in which the installation error is comparatively large. This is, for example, the case when, in the transfer of heat from the medium 1 to the measuring tube 3, there is a low heat transfer value α.

Figure 2:
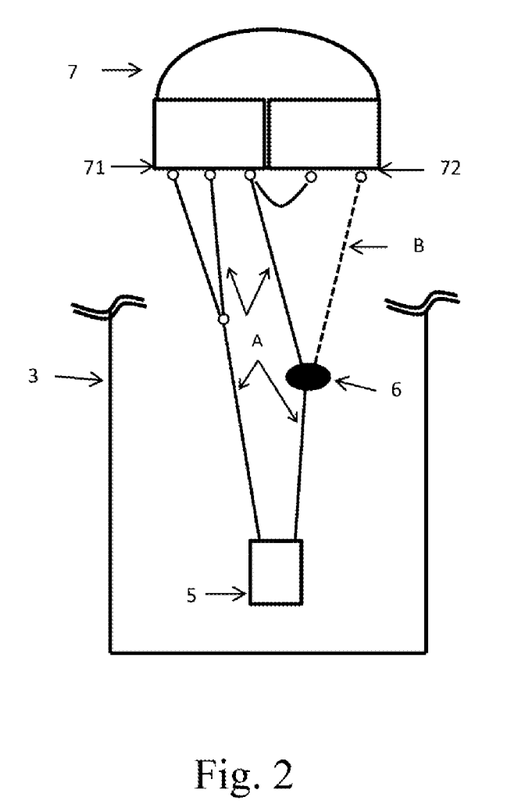
FIG. 2 shows a preferred embodiment of the device according to the invention, in which the electrical connections of the main sensor to the analysis/transmitter unit are realized in a three-conductor circuit.

FIG. 2 shows an advantageous embodiment of the invention in which the electrical connection of the main sensor 5 to the analysis/transmitter unit 7 is realized with three conductors. In this context, the main sensor 5 that is closer to the base has two connecting conductors made of a material A. The first connecting conductor is connected to a first inner conductor pair made of the same material A. The second connecting conductor is connected to a second inner conductor pair. The second inner conductor pair consists of a first inner conductor made of the material A and a second inner conductor made of a second material B different from the first material. The connecting and inner conductors made of the material A are represented by a continuous line, and the inner conductor made of the material B is represented by a dashed line. The measuring point of the thermocouple or of the auxiliary sensor 6 is formed by the connection of the intermediate conductor made of the material A and of the inner conductor pair with inner conductors made of the materials A and B.

Three conductors then run to a first input 71 of the analysis/transmitter unit 7: the first inner conductor pair (consisting of the two inner conductors of the material A) and the inner conductor made of the material A of the second inner conductor pair run to the first input. This inner conductor made of the material A is, moreover, connected via a bridge to a second input 72 of the analysis/transmitter unit 7. The inner conductor made of the material B runs to the second input of the analysis/transmitter unit as a further conductor. The signals of the resistance-based main sensor 5 are transmitted in a three-conductor circuit to the first input 71 of the analysis/transmitter unit 7; the signals of the thermoelectric-based auxiliary sensor 6 are transmitted to the input 72 of the analysis/transmitter unit 7. In this example of an embodiment, the electrical circuitry of the connecting wires from the main sensor 5 and the auxiliary sensor 6 is realized in a space-saving manner and is, accordingly, particularly advantageous.

If the advantageous development of the invention, in which the rate of the drift of the auxiliary sensor 6 within the temperature range assumed by the medium is less by at least one order of magnitude (a factor of 10) than the rate of the drift of the main sensor 5, is used, a suitable selection of the materials A and B for the connecting conductors and the inner conductors must therefore be made. If, for example, copper is used as material A and nickel is used as material B, a copper/copper/nickel thermocouple is formed. No changes in the crystal lattice and no intercrystalline corrosion in both thermocouple legs are anticipated for a copper/copper/nickel thermocouple within a range up to 200° C. This means that the thermocouple or auxiliary sensor 6 experiences a negligible drift in the temperature range assumed by the medium 1, in comparison to the resistance-based main sensor 5.

FIG. 3 shows the thick-walled protective tube 8 that contains the exchangeable measuring insert tube 9. The main sensor 5 and auxiliary sensor 6 are arranged on the measuring insert tube 9. The diameter of the base 91 of the measuring insert tube 9 is greater than the diameter of the measuring insert tube 9. The measuring insert tube 9 is thereby guided within the protective tube 8. A thermally-conductive foil 10 is attached on the side of the measuring insert tube base 91 facing the protective tube 8.

Figure 4:
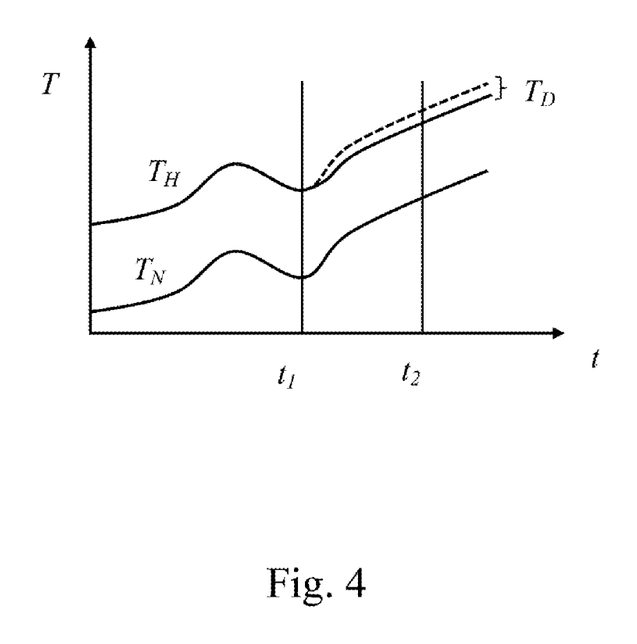
FIG. 4 shows the temporal course of the measurement values of the main and auxiliary sensors in the event of a drift of the main sensor.

FIG. 4 shows the temporal course for the measurement values of both uncorrected values from main sensor 5 and auxiliary sensor 6. Assuming that the insulation is intact, the uncorrected measurement values generally always run parallel. In the time interval between time point $t_1$ and time point $t_2$, a course that is not parallel is observed.

A criterion for the non-parallel course is stored in the analysis/transmitter unit 7. This can, for example, represent a non-constant differential curve of the two temporal courses. The fact that the differential curve is not constant is then detected by the derivative of the differential curve exceeding a specified threshold in the time interval between time point $t_1$ and time point $t_2$.

Since the auxiliary sensor 6 drifts to a negligible extent in comparison to the main sensor 5, the non-parallel course is caused exclusively by a drift of the main sensor 5. A deviation temperature $T_D$ is identified after the time interval between time point $t_1$ and time point $t_2$. The deviation temperature $T_D$ corresponds to the deviation of the uncorrected temperature of the main sensor 5 from a course parallel to the auxiliary sensor 6. The deviation temperature $T_D$ is therefore the drift $T_D$ of the main sensor 5. If a deviation temperature $T_D$ is identified, then a message regarding the drift is output. The measurement values of the main sensor 5 are corrected to a course parallel to the measurement values of the auxiliary sensor 6.

The invention claimed is:

1. A device for determining the temperature of a medium in a tube or in a container,
   wherein the device is structured to be inserted into the tube or container wall, the device comprising:
   a measuring tube adapted to protrude into the medium, the measuring tube closed at a distal end by a measuring tube base;
   a main sensor disposed within the measuring tube, wherein the main sensor is a resistance-based temperature sensor; and
   an auxiliary sensor disposed within the measuring tube and arranged at a fixed offset from the main sensor relative to a longitudinal axis of the measuring tube, the main sensor arranged closer to the measuring tube base than the auxiliary sensor, wherein auxiliary sensor is a thermoelectric-based temperature sensor;

an analysis/transmitter unit to which the main sensor and the auxiliary sensor transmit measurement values, wherein the main sensor and the auxiliary sensor each include an electrical measuring circuit having electrical insulation against the measuring tube, such that changes to the electrical insulation of each measuring circuit differently influence the measurement values from the main sensor and auxiliary sensor, and wherein, when a difference between the measurement values from the main sensor and auxiliary sensor exceeds a specified threshold, the analysis/transmitter unit generates an error message relating to the integrity of the device.

2. The device of claim 1, wherein the main sensor has a greater measuring precision than the auxiliary sensor.

3. The device of claim 1, wherein the main sensor has a greater thermal mass than the auxiliary sensor.

4. The device of claim 1, wherein the main sensor is a platinum sensor.

5. The device of claim 4, wherein the main sensor is a Pt 200 sensor.

6. The device of claim 1, wherein the main sensor and auxiliary sensor each include electrical connections, wherein the respective electrical connections of the main sensor and auxiliary sensor are connected to two separate inputs of the analysis/transmitter unit.

7. The device of claim 6, wherein the electrical connections of the main sensor to the analysis/transmitter unit include three or, at most, four conductors.

8. The device of claim 1, wherein the measuring tube is metallic and is adapted as a protective tube.

9. The device of claim 8, wherein the protective tube contains a measuring insert tube, wherein the measuring insert tube contains the main sensor and auxiliary sensor.

10. The device of claim 9, wherein the measuring insert tube and the protective tube are adapted such that the measuring insert tube is substantially radially centered in the protective tube.

11. The device of claim 9, wherein measuring insert tube includes an insert base having a side adjacent the protective tube, and wherein a thermally conductive foil is attached to the measuring insert tube on the side adjacent the protective tube.

12. A method for determining a temperature of a medium in a tube or in a container, the method comprising:

providing a device structured to be inserted into the tube or container wall, the device comprising:

a measuring tube adapted to protrude into the medium, the measuring tube closed at a distal end by a measuring tube base;

a main sensor disposed within the measuring tube, wherein the main sensor is a resistance-based temperature sensor; and an auxiliary sensor disposed within the measuring tube and arranged at a fixed offset from the main sensor relative to a longitudinal axis of the measuring tube, the main sensor arranged closer to the measuring tube base than the auxiliary sensor, wherein auxiliary sensor is a thermoelectric-based temperature sensor;

an analysis/transmitter unit to which the main sensor and the auxiliary sensor transmit a main measurement value and an auxiliary measurement value, respectively, wherein the main sensor and the auxiliary sensor each include an electrical measuring circuit having electrical insulation against the measuring tube, such that changes to the electrical insulation of each measuring circuit differently influence the measurement values from the main sensor and auxiliary sensor;

determining a difference between the main measurement value from the main sensor and auxiliary measurement value from the auxiliary sensor using the analysis/transmitter unit;

when the difference is greater than a first specified threshold, generating and outputting an error message concerning the integrity of the electrical insulation of the device;

when the difference is less than a second specified threshold, registering the main measurement value as the temperature of the medium in the analysis/transmitter unit; and when the difference is between the second specified threshold and the first specified threshold:

determining a corrected temperature of the main sensor as the sum of the main measurement value and the product of the difference and a main correction factor for correcting the main sensor;

determining a corrected temperature of the auxiliary sensor as the sum of the auxiliary measurement value and the product of the difference and an auxiliary correction factor for correcting the auxiliary sensor; and registering the temperature of the medium as an average of the corrected temperature of the main sensor and the corrected temperature of auxiliary sensor.

13. The method of claim 12, wherein the main sensor and auxiliary sensor each experience a drift, wherein a rate of the drift of the auxiliary sensor in the temperature range of the medium is less by at least a factor of 10 than a rate of the drift of the main sensor.

14. The method of claim 13, wherein a specified uncorrected temperature value of the auxiliary sensor and an uncorrected temperature value of the main sensor associated therewith are stored in the analysis/transmitter unit, and wherein, when the difference is between the second specified threshold and the first specified threshold and when the auxiliary measurement value exceeds the specified uncorrected temperature value of the auxiliary sensor and the main measurement value of the main sensor deviates from the uncorrected temperature value of the main sensor associated therewith by a third specified threshold, the method further comprises:

outputting a message concerning the drift of the main sensor; and updating the main measurement value of the main sensor to be the uncorrected temperature value associated with the specified uncorrected temperature value of the auxiliary sensor.

15. The method of claim 12, wherein a temporal course of the measurement values from the main sensor and auxiliary sensor are stored in the analysis/transmitter unit.

16. The method of claim 15, wherein, when the difference is between the second specified threshold and the first specified threshold and when the temporal course of the measurement values from the main sensor and auxiliary sensor deviate within a specified time span by more than another specified threshold from a parallel course, the method further comprises:
- outputting a message concerning a drift of the main sensor; and
- updating the measurement value of the main sensor to a course parallel to the measurement values of the auxiliary sensor.

* * * * *